United States Patent
Custer et al.

(10) Patent No.: US 9,079,500 B2
(45) Date of Patent: Jul. 14, 2015

(54) SYSTEM AND METHOD FOR ADJUSTING BRAKING PRESSURE

(71) Applicant: Bendix Commercial Vehicle Systems LLC, Elyria, OH (US)

(72) Inventors: Robert J. Custer, Westlake, OH (US); Charles E. Ross, Nova, OH (US); Srikiran Kosanam, Elyria, OH (US); William P. Amato, Avon, OH (US)

(73) Assignee: Bendix Commercial Vehicle Systems, LLC, Elyria, OH (US)

( * ) Notice: Subject to any disclaimer, the term of this patent is extended or adjusted under 35 U.S.C. 154(b) by 0 days.

(21) Appl. No.: 14/334,357

(22) Filed: Jul. 17, 2014

(65) Prior Publication Data
US 2014/0330502 A1 Nov. 6, 2014

Related U.S. Application Data

(62) Division of application No. 13/015,203, filed on Jan. 27, 2011, now Pat. No. 8,823,504.

(51) Int. Cl.
*B60K 31/08* (2006.01)
*B60W 30/14* (2006.01)
(Continued)

(52) U.S. Cl.
CPC .............. *B60K 31/08* (2013.01); *B60K 31/0008* (2013.01); *B60T 7/22* (2013.01); *B60T 8/17555* (2013.01); *B60W 10/184* (2013.01); *B60W 30/02* (2013.01); *B60W 30/14* (2013.01); *B60W 30/16* (2013.01); *B60T 2201/02* (2013.01); *B60T 2260/08* (2013.01); *B60W 2520/10* (2013.01);

(Continued)

(58) Field of Classification Search
CPC ... B60K 31/08; B60K 31/0008; B60W 30/14; B60W 10/184; B60W 30/02; B60W 30/16; B60W 2540/18; B60W 2520/26; B60W 2250/146; B60W 2520/125; B60W 2550/308; B60W 2520/10; B60W 2550/302; B60W 2520/14; B60W 2710/182; B60T 8/17555; B60T 7/22; B60T 2260/08; B60T 2201/02
USPC ............................. 701/96; 340/440, 338, 438
See application file for complete search history.

(56) References Cited

U.S. PATENT DOCUMENTS

| | | | |
|---|---|---|---|
| 4,647,115 A | 3/1987 | Leiber et al. | |
| 5,369,585 A | 11/1994 | Okubo | |

(Continued)

OTHER PUBLICATIONS

Election/Restriction Office Action for related U.S. Appl. No. 13/015,203, dated May 28, 2013.

(Continued)

*Primary Examiner* — Mary Cheung
*Assistant Examiner* — Brian P Sweeney
(74) *Attorney, Agent, or Firm* — Brian E. Kondas; Eugene E. Clair; Cheryl L. Greenly

(57) ABSTRACT

A vehicle control system includes a forward vehicle sensor transmitting a forward vehicle message based on a distance to a forward vehicle. An adaptive cruise controller receives the forward vehicle message and receives at least one additional message indicating a respective status of the vehicle, the adaptive cruise controller sets a braking pressure for an adaptive cruise controller braking event above a default braking pressure if the adaptive cruise controller determines, based on the at least one of the additional messages, that the vehicle will maintain stability during the adaptive cruise controller braking event.

8 Claims, 2 Drawing Sheets

(51) Int. Cl.
  *B60K 31/00*   (2006.01)
  *B60T 7/22*   (2006.01)
  *B60T 8/1755*   (2006.01)
  *B60W 10/184*   (2012.01)
  *B60W 30/02*   (2012.01)
  *B60W 30/16*   (2012.01)

(52) U.S. Cl.
  CPC ...... *B60W 2520/125* (2013.01); *B60W 2520/14* (2013.01); *B60W 2520/26* (2013.01); *B60W 2540/18* (2013.01); *B60W 2550/146* (2013.01); *B60W 2550/302* (2013.01); *B60W 2550/308* (2013.01); *B60W 2710/182* (2013.01)

(56) References Cited

U.S. PATENT DOCUMENTS

| | | |
|---|---|---|
| 6,203,120 B1 | 3/2001 | Urai et al. |
| 6,357,839 B1 | 3/2002 | Eckert |
| 6,962,396 B2 | 11/2005 | Faye et al. |
| 7,159,954 B2 | 1/2007 | Goebels et al. |
| 7,284,802 B2 | 10/2007 | Ziegler et al. |
| 8,024,099 B2 * | 9/2011 | Suzuki et al. .................... 701/70 |
| 2004/0193353 A1 * | 9/2004 | Dunoyer et al. ................ 701/96 |
| 2004/0201272 A1 | 10/2004 | O'Dea |

OTHER PUBLICATIONS

Response to Restriction Requirement for related U.S. Appl. No. 13/015,203, filed Jun. 27, 2013.
Election/Restriction Office Action for related U.S. Appl. No. 13/015,203, dated Jul. 16, 2013.
Response to Restriction Requirement for related U.S. Appl. No. 13/015,203, filed Aug. 15, 2013.
Non-Final Office Action for related U.S. Appl. No. 13/015,203, dated Sep. 26, 2013.
Response to Office Action for related U.S. Appl. No. 13/015,203, filed Jan. 27, 2014.
Notice of Allowance and Fees Due for related U.S. Appl. No. 13/015,203, dated Apr. 2, 2014.
Submission of Replacement Drawings for related U.S. Appl. No. 13/015,203, filed Apr. 7, 2014.
Statement of Substance Interview for related U.S. Appl. No. 13/015,203, dated May 2, 2014.
Bendix Wingman ACB (Active Cruise Braking), Service Data Sheet SD-13-3333, BW2774, Bendix Commercial Vehicle Systems LLC, Mar. 2011.

* cited by examiner

SYSTEM AND METHOD FOR ADJUSTING BRAKING PRESSURE

BACKGROUND

The present invention relates to adaptive control with braking systems. It finds particular application in conjunction with adjusting braking pressure during an adaptive control with braking event and will be described with particular reference thereto. It will be appreciated, however, that the invention is also amenable to other applications.

Some adaptive control with braking (ACB) cruise control systems use pneumatic pressure from stability or traction control systems as the pressure source for braking events initiated by the ACB system. In order to reduce the chances of inducing instability (e.g., trailer swing) during braking events initiated by the ACB system on non-ideal traction surfaces or while the vehicle is in a curve, maximum estimated ACB system braking pressures are set lower than the maximum pneumatic pressures available from the stability and traction control systems. For example, maximum estimated ACB system braking pressures are set to pressures that are safe during curves (which are lower than safe braking pressures while on straight roads). In some braking events initiated by the ACB system, it is desirable to allow braking pressures above the maximum estimated ACB system braking pressures.

The present invention provides a new and improved apparatus and method which addresses the above-referenced problems.

SUMMARY

In one aspect of the present invention, it is contemplated to adjust braking pressure during an adaptive cruise controller braking event.

In one embodiment, a vehicle control system includes a forward vehicle sensor transmitting a forward vehicle message based on a distance to a forward vehicle. An adaptive cruise controller receives the forward vehicle message and receives at least one additional message indicating a respective status of the vehicle, the adaptive cruise controller sets a braking pressure for an adaptive cruise controller braking event above a default braking pressure if the adaptive cruise controller determines, based on the at least one of the additional messages, that the vehicle will maintain stability during the adaptive cruise controller braking event.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
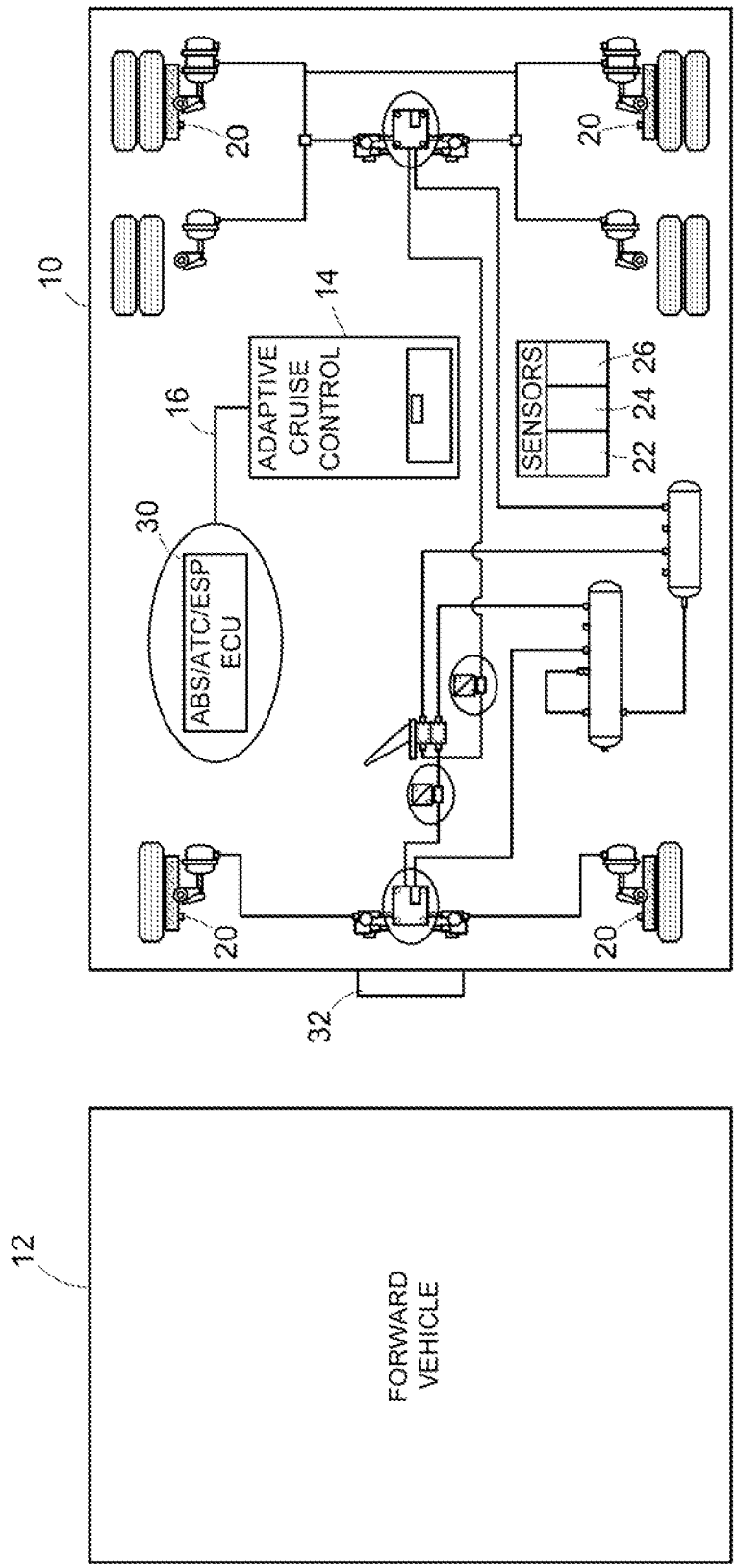
FIG. 1 illustrates a schematic representation of a vehicle in accordance with one embodiment of an apparatus illustrating principles of the present invention.

With reference to FIG. 1, a simplified component diagram of an exemplary vehicle 10 (e.g. a host vehicle), traveling on a path (e.g., a road) behind a forward vehicle 12, is illustrated in accordance with one embodiment of the present invention. Although the vehicle 10 is illustrated as a straight vehicle (e.g., a straight truck), it is to be understood that the vehicle 10 may also be an articulated vehicle (e.g., an articulated truck) including one or more trailers.

The vehicle 10 includes one or more vehicle control systems. In one embodiment, one of the vehicle control systems is an adaptive control with braking (ACB) cruise control system, which includes an adaptive cruise controller 14. The adaptive cruise controller 14 is electrically connected to a vehicle communication bus 16. At least one sensor is included on the vehicle 10. In one embodiment, the vehicle 10 includes a speed sensor 20, a yaw rate sensor 22, a lateral acceleration sensor 24, and a steering angle sensor 26. However, other embodiments including additional vehicle sensors are also contemplated. Although it is not illustrated, in one embodiment each of the sensors 20, 22, 24, 26 electrically communicates with the vehicle communication bus 16. In this embodiment, it is contemplated that any messages transmitted between the sensors and one or more vehicle controllers, via the communication bus 16, is compatible with the J1939 standard. However, other embodiments, in which one or more of the sensors directly communicates with one or more vehicle controllers without being transmitted over the vehicle communication bus (e.g., the speed sensor directly communicates with the adaptive cruise controller) are also contemplated. In these other embodiments, it is contemplated that messages transmitted directly between the sensors and vehicle controllers may or may not be J1939 compatible. If a message is not J1939 compatible, it is contemplated that a message transmitted between a sensor and a vehicle controller conveys information as, for example, an electrical signal.

In one embodiment, one of the other vehicle control systems on the vehicle 10 is an anti-lock braking system (ABS), which includes an ABS controller 30. It is contemplated that in addition to controlling the vehicle brakes to avoid brake locking events, the ABS controller 30 is used for maintaining a history of brake locking events and other traction events e.g., roll stability events in which an electronic stability program (ESP) senses at least one of the vehicle wheels looses traction and applies one or more of the vehicle brakes to avoid a vehicle rollover event). Although the present embodiment contemplates the ABS controller 30 maintaining a traction event history of the vehicle 10 for brake locking events and roll stability events, it is also contemplated that the ABS controller 30 also maintains a traction event history of the vehicle 10 for other traction events.

In one embodiment, both the tractor and the trailer of the vehicle 10 have an ABS. However, other embodiments in which the trailer of the vehicle 10 does not have an ABS are also contemplated. In addition, it is also contemplated that the ABS on the trailer of the vehicle 10 may operate differently than the ABS on the tractor of the vehicle 10.

Figure 2:
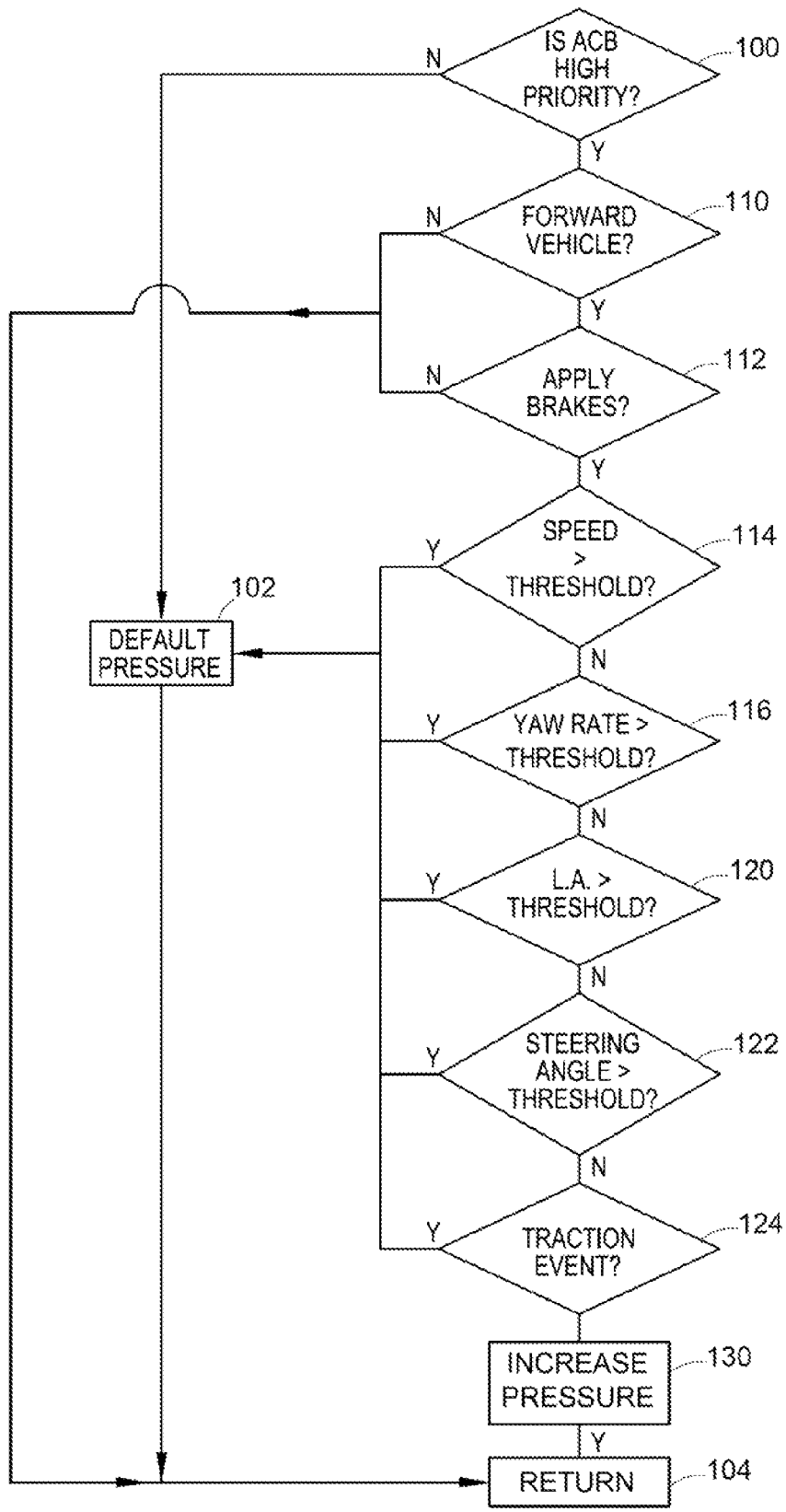
FIG. 2 illustrates an exemplary methodology of setting a braking pressure in accordance with one embodiment illustrating principles of the present invention.

With reference to FIG. 2, an exemplary methodology of the system shown in FIG. 1 is illustrated. The methodology may be implemented as a subroutine in a computer program. As illustrated, the blocks represent functions, actions and/or events performed therein. It will be appreciated that electronic and software systems involve dynamic and flexible processes such that the illustrated blocks and described sequences can be performed in different sequences. It will also be appreciated by one of ordinary skill in the art that elements embodied as software may be implemented using various programming approaches such as machine language, procedural, object-oriented or artificial intelligence techniques. It will further be appreciated that, if desired and appropriate, some or all of the software can be embodied as part of a device's operating system.

With reference to FIGS. 1 and 2, a determination is made, in a step 100 whether a higher priority event (e.g., a traction braking event) is requesting one of the vehicle controllers (e.g., the ABS controller 30) to apply the vehicle brakes. For example, the adaptive cruise controller 14 receives an additional message, via the bus 16, from another vehicle controller indicating another vehicle event (e.g., a vehicle roll-over event). If a higher priority (e.g., more critical) vehicle event (e.g., a vehicle roll-over event) is requesting one of the vehicle controllers to apply the vehicle brakes, control passes to a step 102 for setting/maintaining the braking pressure to a default (e.g., standard) pressure for the ACB cruise control system. Control then passes to a step 104 to return (e.g., to the main computer program, since the steps of the subroutine are completed). In this manner, a lower priority is set for adjusting the brake pressure above the default pressure.

If on the other hand, no other higher priority (e.g., more critical) vehicle event (e.g., a vehicle roll-over event) is requesting one of the vehicle controllers to apply the vehicle brakes, a higher priority is set for adjusting the brake pressure above the default pressure. In this case, control passes to a step 110.

In the step 110, the adaptive cruise controller 14 determines if the forward vehicle 12 is present. More specifically, a forward vehicle sensor 32 on the vehicle 10 senses a distance to the forward vehicle 12. In one embodiment, the forward vehicle sensor 32 is mounted toward a front of the vehicle 10 and uses a radar based signal to sense the forward vehicle 12 (and a distance to the forward vehicle 12). It is contemplated that any of the vehicle sensors 20, 22, 24, 26 may be internal to a radar system. The forward vehicle sensor 32 electrically communicates with the vehicle communication bus 16. In other embodiments, a velocity of the forward vehicle 12 is determined (e.g., based on changes in distance to the forward vehicle 12) is/are sensed by the forward vehicle sensor 32.

The forward vehicle sensor 32 transmits a message to the adaptive cruise controller 14, via the bus 16, based on the distance to the forward vehicle 12. As discussed above, it is also contemplated that the message to the adaptive cruise controller 14 is based on the velocity of the forward vehicle 12. The adaptive cruise controller 14 receives the message from the forward vehicle sensor 32 and determines the distance to (and/or velocity of) the forward vehicle 12 based on the message. In the step 110, the adaptive cruise controller 14 determines the forward vehicle 12 is present if the forward vehicle 12 is within a predetermined forward distance threshold (e.g. about 30 m). The adaptive cruise controller 14 determines a speed of the forward vehicle 12, relative to a speed of the vehicle 10, based on multiple messages, which identify multiple respective distances to the forward vehicle 12, over a period of time. For example, if the distance to the forward vehicle 12 is becoming less over the period of time, the adaptive cruise controller 14 determines the relative speed of the forward vehicle 12 is less than the vehicle 10; if the distance to the forward vehicle 12 is becoming greater over the period of time, the adaptive cruise controller 14 determines the relative speed of the forward vehicle 12 is greater than the vehicle 10. The adaptive cruise controller 14 may determine the actual speed of the forward vehicle 12 based on the speed of the vehicle 10 and the change in distance between the vehicle 10 and the forward vehicle 12 over time.

If the adaptive cruise controller 14 determines the forward vehicle 12 is present, the adaptive cruise controller 14 determines, in a step 112, whether it is desirable to apply the vehicle brakes. For example, it is desirable to apply the vehicle brakes if the distance to the forward vehicle 12 is less than the predetermined forward distance threshold and/or the speed of the vehicle 10 is greater than a target speed set, for example, by the vehicle operator and stored in the adaptive cruise controller 14. If it is determined desirable to apply the vehicle brakes in the step 112, control passes to a step 114; otherwise, control passes to the step 104 to return.

In the step 114, a determination is made whether the speed of the vehicle 10 is above a predetermined increased braking threshold speed (e.g., about 20 mph). For example, the adaptive cruise controller 14 receives an additional message, via the bus 16, indicating the speed of the vehicle 10. If the speed of the vehicle 10 is above the predetermined increased braking threshold speed, control passes to the step 102 for setting/maintaining the braking pressure to the default pressure for the ACB cruise control system. Control passes to the step 104 to return. Otherwise, if the speed of the vehicle 10 is not above the predetermined increased braking threshold speed in the step 114, control passes to a step 116.

In the step 116, a determination is made whether a yaw rate of the vehicle 10 is above a predetermined yaw rate threshold (e.g., about 4 degrees/second). For example, the adaptive cruise controller 14 receives an additional message, via the bus 16, indicating the yaw rate of the vehicle 10. If the yaw rate of the vehicle 10 is above the predetermined yaw rate threshold, control passes to the step 102 for setting/maintaining the braking pressure to the default pressure for the ACB cruise control system. Control passes to the step 104 to return. Otherwise, if the yaw rate of the vehicle 10 is not above the predetermined yaw rate threshold, control passes to a step 120.

In the step 120, a determination is made whether a lateral acceleration of the vehicle 10 is above a predetermined lateral acceleration threshold (e.g., about 2 $ms^2$). For example, the adaptive cruise controller 14 receives an additional message, via the bus 16, indicating the lateral acceleration of the vehicle 10. If the lateral acceleration of the vehicle 10 is above the predetermined lateral acceleration threshold, control passes to the step 102 for setting/maintaining the braking pressure to the default pressure for the ACB cruise control system. Control passes to the step 104 to return. Otherwise, if the lateral acceleration of the vehicle 10 is not above the predetermined lateral acceleration threshold, control passes to a step 122.

In the step 122, a determination is made whether a steering angle of the vehicle 10 is above a predetermined steering angle threshold (e.g., about 90 degrees). For example, the adaptive cruise controller 14 receives an additional message, via the bus 16, indicating the steering angle of the vehicle 10. If the steering angle of the vehicle 10 is above the predetermined steering angle threshold, control passes to the step 102 for setting/maintaining the braking pressure to the default pressure for the ACB cruise control system. Control passes to the step 104 to return. Otherwise, if the steering angle of the vehicle 10 is not above the predetermined steering angle threshold, control passes to a step 124.

In the step 124, a determination is made whether a last traction event occurred within a predetermined traction event time threshold (e.g., about 30 seconds). For example, the adaptive cruise controller 14 sends a message to the ABS controller 30 via the bus 16. The message requests information from the ABS controller 30 regarding when the last traction event occurred. After receiving the message, the ABS controller 30 sends the requested information, as a message, via the bus 16 to the adaptive cruise controller 14. Once the adaptive cruise controller 14 receives the message from the ABS controller 30, the adaptive cruise controller 14 determines if the last traction event occurred within the predetermined traction event time threshold. If the last traction event occurred within the predetermined traction event time threshold, control passes to the step 102 for setting/maintaining the braking pressure to the default pressure for the ACB cruise control system. Control passes to the step 104 to return. Otherwise, if the last traction event did not occur within the predetermined traction event time threshold, control passes to a step 130.

In the step 130, the ACB cruise control system braking pressure is set above the default pressure. The default pressure used in an ACB cruise control system is such that it achieves an acceleration of about $-2$ m/s$^2$. In one embodiment, the braking pressure is increased to achieve a deceleration of about 2 m/s$^2$ (e.g., from $-2$ m/s$^2$ to $-4$ m/s$^2$). In other embodiments, different vehicles having different vehicle configurations (e.g., different weights and/or weight distributions) will require different increased pressures to achieve the same or different requested decelerations (as determined by the vehicle's ABS system). Control then passes to the step 104 to return.

The methodology described above is intended to identify circumstances when it is acceptable to provide increased braking during ACB cruise control system braking events. In general, it is contemplated to determine it is acceptable to provide increased braking during ACB cruise control braking events if a stability of the vehicle 10 will be maintained. For example, adaptive cruise controller 14 determines the stability of the vehicle 10 will be maintained when the vehicle 10 is traveling below the predetermined increased braking threshold speed while on a straight path, and if no traction events have occurred within a predetermined traction event time threshold. In this case, the adaptive cruise controller 14 determines that it is acceptable to provide the increased braking during an ACB cruise control system braking event.

Although it is not discussed in detail above, it is also contemplated that stability may be determined, among other known methods, based on a difference between a change in the steering angle and a change in the yaw rate.

The steps 116, 120, and 122 of determining whether the yaw rate of the vehicle 10 is above the predetermined yaw rate threshold, determining whether the lateral acceleration of the vehicle 10 is above the predetermined lateral acceleration threshold, and determining whether the steering angle of the vehicle 10 is above the predetermined steering angle threshold, respectively, are intended to identify when the vehicle 10 is traveling in a straight path or, alternatively, when the vehicle 10 is traveling in a curved path. The adaptive cruise controller 14 determines the vehicle 10 is traveling in a curved path if at least one of the yaw rate of the vehicle 10 is above the predetermined yaw rate threshold, the lateral acceleration of the vehicle 10 is above the predetermined lateral acceleration threshold, and the steering angle of the vehicle 10 is above the predetermined steering angle threshold. Otherwise, the adaptive cruise controller 14 determines the vehicle 10 is traveling in a straight path if none of the yaw rate of the vehicle 10 is above the predetermined yaw rate threshold, the lateral acceleration of the vehicle 10 is above the predetermined lateral acceleration threshold, or the steering angle of the vehicle 10 is above the predetermined steering angle threshold.

If the vehicle 10 is traveling below the predetermined increased braking threshold speed while on a straight path, and if no traction events have occurred within a predetermined traction event time threshold, the adaptive cruise controller 14 determines that it is acceptable to provide the increased braking during an ACB cruise control system braking event. In this case, the adaptive cruise controller 14 sets the ACB cruise control system braking pressure above the default pressure to the increased braking pressure (e.g., to increase an acceleration from $-2$ m/s$^2$ to $-4$ m/s). Optionally, the adaptive cruise controller 14 also determines that it is acceptable to provide the increased braking during an ACB cruise control system braking event only if the vehicle has not traveled in a curved path within a predetermined time. Otherwise, if the vehicle 10 is not traveling below the predetermined increased braking threshold speed, if the vehicle 10 is traveling on a curved path, or if a traction event has occurred within the predetermined traction event time threshold, then the adaptive cruise controller 14 determines that it is not acceptable to provide the increased braking during the ACB cruise control system braking event. In this case, the adaptive cruise controller 14 sets the ACB cruise control system braking pressure to the default pressure.

Although the embodiment discussed above describes adjusting the ACB cruise control system braking pressure above the default pressure, it is also contemplated that the vehicle 10 includes other control systems instead or, in addition to, the ACB cruise control system. For example, the system and method described above may also be used for adjusting braking pressure(s) above respective default pressures of a collision mitigation system (CMS) and/or an autonomous emergency braking system, etc.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A vehicle control system, comprising:
    at least one vehicle sensor measuring a respective status of the vehicle and transmitting a respective message based on the status; and
    an adaptive cruise controller receiving the message and setting a braking pressure for an adaptive cruise controller braking event above a default braking pressure based on the message, the adaptive cruise controller setting the braking pressure above the default braking pressure unless any of the at least one messages indicates the vehicle is not traveling in a straight path.

2. The vehicle control system as set forth in claim 1, wherein:
    the adaptive cruise controller sets the braking pressure above the default braking pressure if the vehicle is traveling below a predetermined increased braking threshold speed.

3. The vehicle control system as set forth in claim 1, wherein:
    the at least one vehicle sensor includes:
        a yaw rate sensor, a lateral acceleration sensor, and a steering angle sensor; and
    the adaptive cruise controller sets the braking pressure above the default braking pressure unless the adaptive cruise controller receives at least one of:
        the message from the yaw rate sensor indicating a yaw of the vehicle is above a predetermined yaw rate angle;

the message from the lateral acceleration sensor indicating the lateral acceleration of the vehicle is above a predetermined lateral acceleration; and the message from the steering angle sensor indicating the steering angle of the vehicle is above a predetermined steering angle.

4. The vehicle control system as set forth in claim 1, wherein:

if the adaptive cruise controller receives a message from another vehicle controller indicating another vehicle event is relatively higher priority than adjusting the braking pressure, the adaptive cruise controller sets a low priority to adjusting the braking pressure.

5. A method for adjusting a braking pressure for an adaptive cruise controller braking event, the method comprising:

receiving at least one message, indicating a status of a host vehicle, by an adaptive cruise controller from a respective host vehicle sensor;

adjusting a braking pressure for an adaptive cruise controller braking event above a default braking pressure based on the message, the adjusting including:

adjusting the braking pressure for the adaptive cruise controller braking event above the default braking pressure unless any of the at least one messages received by the adaptive cruise controller indicates the host vehicle is not traveling in a straight path.

6. The method for adjusting a braking pressure for an adaptive cruise controller braking event as set forth in claim 5, wherein the receiving step includes at least one of:

receiving the message from a vehicle yaw rate sensor indicating a yaw rate of the host vehicle;

receiving the message from a vehicle lateral acceleration sensor indicating a lateral acceleration of the host vehicle; and receiving the message from a vehicle steering angle sensor indicating a steering angle of the host vehicle.

7. The method for adjusting a braking pressure for an adaptive cruise controller braking event as set forth in claim 6, further including:

determining if the host vehicle is traveling in a straight path unless the adaptive cruise controller receives at least one of the message from the vehicle yaw rate sensor indicating a yaw of the host vehicle is above a predetermined yaw threshold, the message from the vehicle lateral acceleration sensor indicating a lateral acceleration of the host vehicle is above a predetermined lateral acceleration threshold, and the message from the vehicle steering angle sensor indicating a steering angle of the host vehicle is above a predetermined steering angle threshold.

8. The method for adjusting a braking pressure for an adaptive cruise controller braking event as set forth in claim 5, further including:

receiving a message from another vehicle controller indicating another host vehicle event has a relatively higher priority than adjusting the braking pressure for the adaptive cruise controller braking event above the default braking pressure; and based on the message from the other vehicle controller indicating the other host vehicle event has a relatively higher priority, adjusting a low priority to adjusting the braking pressure for the adaptive cruise controller braking event above the default braking pressure.

* * * * *